United States Patent Office 2,967,890
Patented Jan. 10, 1961

2,967,890

PROCESS FOR PREPARING BETA-ALIPHATICOXY-PROPIONALDEHYDES

John W. Mecorney, Lafayette, and Ellis R. White, Oakland, Calif., assignors to Shell Oil Company, New York, N.Y., a corporation of Delaware No Drawing. Filed Dec. 2, 1958, Ser. No. 777,615

3 Claims. (Cl. 260—602)

This invention pertains to an improved process for the preparation of beta-ether-substituted aldehydes by the addition of alcohols to the olefinic double bond of acrolein.

It has long been known that alcohols can be added to the olefinic double bond of acrolein to form beta-ether-substituted propionaldehydes. However, preparation of these ether-aldehydes by this reaction has been found to be very difficult, as a practical matter. Both the olefinic double bond and the aldehyde group of acrolein are highly reactive, so that a number of reactions are possible— and most have been found to occur—in a reaction system containing both an alcohol and acrolein. Thus, if the reaction system becomes more than slightly acid, the predominant product is the acetal resulting from reaction of three molecules of the alcohol with one molecule of the acrolein, while if the reaction mixture is more than slightly basic, various reactions involving condensation and/or polymerization of the acrolein and/or the alcohol occur to a major extent. It has been proposed to react the alcohol and acrolein in systems in which the pH is carefully controlled to maintain the system in a neutral to slightly acid condition. It has been found that while such a system provides high yields of the desired beta-ether-substituted propionaldehydes, the conversion of acrolein to the ether-aldehydes which can be obtained in such a system is rather low, in most cases not exceeding about 75% of the acrolein charged. Such a reaction system accordingly requires separation of unreacted acrolein and its recycle. Such a procedure is undesirable, since special precautions are required in effecting separation of the unreacted acrolein to prevent reversion of the ether-aldehyde to the precursor alcohol and acrolein. Also, recycle of the reactive acrolein desirably is avoided.

We have now discovered a process which effects virtualy quantitative conversion of acrolein to beta-ether-substituted propionaldehydes as substantially the only products. Briefly, it has been discovered that if an alcohol is reacted in liquid phase with acrolein in the presence of a mono(hydrocarbon amine) salt of a strong inorganic, polybasic acid, the acrolein is converted— substantially quantitatively—that is, 90–95% or more of the acrolein is converted—to the corresponding beta-ether-substituted propionaldehyde, as substantially the only product—that is to say, the yield of ether-aldehyde is of the order of 90–95% or more. By conducting the reaction of the alcohol and the acrolein according to our new process, separation of unreacted acrolein from the ether-aldehyde product and recycle of the unreacted acrolein is substantially avoided. The process of this invention thus lends itself admirably to the large-scale production of beta-ether-substituted propionaldehydes from alcohols and acrolein.

The new process effects substantially quantitative selective addition of alcohols to the olefinic double bond of acrolein. It is preferred, of course, that the alcohol chosen in any particular instance be free from substituent groups other than the alcoholic hydroxyl group or groups which are reactive with acrolein under the process conditions, so that undesirable side reactions will not occur. For this reason and because of the desirability of the ether-aldehydes prepared therefrom, the process which we have discovered is of particular value for addition to acrolein of aliphatic alcohols containing only carbon, oxygen and hydrogen atoms. The two principal groups of these alcohols are the unsubstituted alcohols containing, in addition to one or more alcoholic hydroxyl groups, only carbon and hydrogen atoms, and the ether-alcohols—that is, alcohols containing one or more oxy(—O—) linkages. While the suitable alcohols may be either saturated or unsaturated, it is preferred that the alcohol used be free from acetylenic unsaturation; thus the saturated and olefinically—either mono- or poly-olefinically—unsaturated alcohols are preferred. The suitable alcohols can be of either straight-chain or branched-chain configuration, and may contain in their structure either or both of alicyclic or aromatic carbon-to-carbon moieties. While all of primary, secondary and tertiary alcohols are suitable, the alcohols containing at least one hydrogen atom bonded to a carbon atom to which an alcoholic hydroxyl group is bonded—that is, the primary and secondary alcohols—are most reactive, and are most suitable for this reason. The primary monohydric aliphatic alcohols are the most reactive. Examples of suitable alcohols thus include methanol, ethanol, n-propanol, n-butanol, n-hexanol, 1-octanol, 2-ethyl-1-hexanol, 1-decanol, lauryl, myristyl and cetyl alcohols and like high molecular weight aliphatic alcohols, such as tallow alcohols and fat alcohols, ethylene glycol, propylene glycol and like straight-chain primary alkanols, isobutyl alcohol, isoamyl alcohol, sec-butyl-carbinol and like branched-chain primary alkanols, iso-propyl alcohol, sec-butyl alcohol, sec-amyl alcohol, 2-octanol, 5-ethyl-2-nonanol, 7-ethyl-2-methyl-4-undecanol, 3,9-diethyl-6-tridecanol, cyclohexanol and like secondary alcohols, tert-butyl alcohol, tert-amyl alcohol and like tertiary alcohols, benzyl alcohol, phenethyl alcohol and like aralkyl primary alkanols, cyclohexylcarbinol, 2-cyclohexyl-ethan-1-ol and like alicyclic-substituted primary alkanols, allyl alcohol, crotyl alcohol, aliylcarbinol, propenylcarbinol, cinnamic alcohol, 4-pentenol, oleyl alcohol, linoleyl alcohol, 2,4-pentadien-1-ol, 2,4-hexa-dienol and like alkenols and alkapolydienols, methoxy-methanol, 2-methoxyethanol, ethoxymethanol, 2-butyl-oxyethanol, 2-(2-methoxyethoxy)ethanol, 2-allyloxyetha-nol, 2-benzyloxymethanol, 2-phenoxyethanol, diethylene glycol and like ether-alcohols. Of particular interest because of the properties of the beta-aliphaticoxy-propionaldehyde prepared therefrom are the primary monohydric aliphatic alcohols as herein described which contain from 1 to 25 carbon atoms, and of this group of alcohols, the alkanols containing from 1 to 6 carbon atoms are of greatest interest.

We have found that unique catalytic activity for effecting the addition of the primary alcohols to the olefinic double bond of acrolein is exhibited by the mono(hydrocarbon amine) salts of strong, inorganic, polybasic acids, i.e., the salts resulting from neutralization of one of the acidic hydrogen atoms of the acid by a hydrocarbon amine.

In forming these salts, the suitable amines are the "hydrocarbon amine" by which is meant any amine wherein at least one hydrocarbon group is bonded to the amino nitrogen atom any valence bond of the amino nitrogen not satisfied by hydrocarbon being satisfied by hydrogen. Included within the term thus are the hydrocarbon primary amines, dihydrocarbon secondary amines and trihydrocarbon tertiary amines. In these amines, the hydrocarbon group or groups can be aliphatic in character, or they can be aromatic in character. In a given secondary or tertiary amine, the hydrocarbon groups may be the same, or they may be different; they may be of the same character—e.g., aliphatic or aromatic—or they may be of different character. The aliphatic hydrocarbon groups may be of straight-chain or of branched-chain configuration, and they may be saturated or they may be unsaturated. Preferably, the hydrocarbon group or groups are free from olefinic unsaturation. Polyamines also are suitable. Heterocyclic amines wherein two or three of the bonds of the amino nitrogen atom are linked together by a carbon-to-carbon chain as in pyridine and the morpholines also are suitable. The tertiary amines are preferred because of their high catalytic activity and low chemical reactivity with respect to acrolein.

Examples of suitable amines include those wherein the hydrocarbon group or groups are alkyl, such as methyl, ethyl, n- or iso-propyl, n-, sec- or tert-butyl, benzyl, phenethyl, styryl, cyclohexylmethyl, or the like, or are alkenyl, such as allyl or crotyl or the like, or are aromatic, such as the phenyl group, or alkyl-substituted or alkenyl-substituted phenyl groups, such as the methylphenyl group or the alkylphenyl group, or the like, or are cycloalkyl, such as the cyclohexyl, cyclooctyl, the methylcyclohexyl or ethylcyclohexyl or phenylcyclohexyl groups, or the like, or polyamines such as diethylene triamine, triethylene tetramine and the like.

Examples of suitable amines include: mono-, di- and trimethylamines, mono-, di- and tri-ethylamines, mono-, di- and tri-n-propylamines, and their iso-homologs, and the various homologous mono-, di- and tri-butyl-, pentyl-, hexyl-, and like amines, mono-, di-, and tri-allylamines, aniline, diphenylamine, dibenzylamine, ditolylamine, mono-, and di-methylaniline, diethylene triamine, triethyl tetramine, orthophenylenediamine, and the like, pyridine, the phospholines, and like heterocyclic amines. The preferred catalysts are those wherein each of the groups attached to the amino nitrogen atoms contains from 1 to 7 carbon atoms, the mono-, di- and tri-(aliphatic hydrocarbon)amines—that is, the mono-, di-, and tri-alkyl- and alkenyl-amines—of this subclass being particularly useful.

In forming the amine salts used as catalysts, the suitable acids are the strong inorganic polybasic acids. Of these acids, phosphoric acid and sulfuric acid are the most widely available at low cost. Of these two acids, phosphoric acid is preferred because the polar amine salts thereof exhibit a somewhat milder action than do the corresponding salts of sulfuric acid, and the milder activity often permits better control of the reaction.

The catalyst may be preformed—that is the monoamine salt of the acid per se can be used—or the amine salt can be formed in the reaction zone. When this latter procedure is used, the catalyst conveniently is formed by reaction of the necessary amount of the amine with the acid in the alcohol reactant and then the acrolein is added to start the reaction. To form the mono-amine salt, of course, one equivalent of the amine is added per mole (three equivalents) of phosphoric acid, or per mole (two equivalents of sulfuric acid).

According to our new process, a beta-ether-substituted propionaldehyde is prepared by simply bringing together the alcohol and acrolein in the presence of the amine salt phosphate catalyst and maintaining the resulting mixture under those conditions for a sufficient time to insure completion of the desired reaction.

It has been found that addition of the alcohol to acrolein goes forward most effectively at temperatures of from about 25° C. to about 60° C., although temperatures above and below this range may in some cases be employed. It has been found that reaction temperatures within the range of from about 30° C. to about 50° C., and particularly reaction temperatures of about 40° C. (e.g., from about 35° C. to about 45° C.) are especially desirable, inasmuch as it has been found that at these temperatures the desired reaction proceeds to completion at practically feasible rates, but that virtually no side reaction occurs. By conducting the reaction at about 40° C., it has been found that the acrolein is converted substantially quantitatively to the corresponding beta-ether substituted propionaldehyde as substantially the only product.

The reaction between the alcohol and the acrolein can be carried out at substantially atmospheric pressure, or moderately subatmospheric or superatmospheric pressures can be used, as may be desirable and convenient. When conducting the reaction within the preferred temperature range, use of substantially atmospheric pressure is usually most convenient.

Essential to substantially complete conversion of the acrolein to substantially only the desired ether-aldehyde product is the presence of an excess of the alcohol over the amount theoretically required to react with the acrolein charged. Theoretically, one mole of the alcohol reacts with one mole of the acrolein. It has been found necessary in the new process to supply at least 1.5 moles of alcohol per mole of acrolein present in the reaction mixture. Preferably, somewhat larger excesses of alcohol—e.g., 2.0 to 3.0 moles of alcohol, or even more, per mole of acrolein—are provided. Ordinarily, no commensurate additional advantage accrues from the use of more than about 20 moles of alcohol per mole of acrolein, and in most cases it will be found desirable to use not more than 10 moles of alcohol per mole of acrolein.

Also essential to the desired reaction is the presence of a substantial amount of the catalyst. Thus, the concentration of catalyst in the reaction mixture must be at least about 1% of the total weight of that mixture, and preferably the catalyst concentration is at least 2% of the weight of the reaction mixture. Ordinarily, a catalyst concentration in excess of about 10% of the weight of the reaction mixture will be found undersirable, since a greater concentration of catalyst ordinarily does not result in additional advantages over lesser concentrations of catalyst, so that larger excesses of catalyst are economically unjustified, and also because the amine salt catalysts used in this new process will in some cases react to a certain extent with the acrolein. At catalyst concentrations below about 10% of the weight of the reaction mixture, such a reaction between the acrolein and the catalyst does not occur to any significant extent; at higher catalyst concentrations, this side reaction may occur to a significant extent. In most cases, a catalyst concentration of about 3%—e.g. from about 2.5% to about 4.0%—of the weight of the reaction mixture will be found to give optimum results.

Either a single amine salt, or a mixture of two or more of the amine salts may be used, as may be convenient.

It is preferred that the reaction mixture be maintained in a substantially anhydrous condition. While some water can be tolerated in the reaction mixture without causing significant amounts of undesirable side reactions, the presence of more than minor amounts of water is undesirable, inasmuch as the water can react with acrolein to form hydracrylaldehyde. In the presence of the invention, water serves no useful purpose. In view of this fact, and the fact that water can react with the acrolein, it is preferred that the reaction mixture be maintained in a substantially anhydrous condition. By this is meant that the amount of water in the reaction zone should not exceed about 10% of the weight of the reaction mixture and preferably is less than about 5.0% of the weight of the mixture. Desirably, the reaction mixture is completely free from water.

The order in which the alcohol and acrolein reactants are mixed is not in most cases critical. To insure a minimum of side-reactions, however, the acrolein should not come into contact with the catalyst unless the alcohol reactant is present. Thus, desirably, one of two techniques is used: in one, the acrolein is mixed with the alcohol and the catalyst added; in the other, the catalyst is mixed with the alcohol and the acrolein added, preferably slowly and to the thoroughly stirred reaction mixture to prevent local high concentration of the acrolein.

Preferably, molecular oxygen is excluded from the reaction zone—again to prevent undesirable side reactions involving the acrolein.

As will be evident from the foregoing description of the new process, that process can effectively and conveniently be conducted in either a batchwise or a continuous manner.

Upon completion of the reaction, the reaction mixture is composed primarily of the product ether-aldehyde, the catalyst and the excess alcohol used, with at most but very minor amounts of unreacted acrolein and/or by-products being present therein. While any of the usual methods for separating two materials can be used to effect separation of the product ether-aldehyde, it normally will be found to be most convenient to distill that ether-aldehyde from the final reaction mixture. To avoid reversion of the ether-aldehyde, the "flashing" technique preferably is used—that is, the final reaction mixture is distilled rapidly at low pressure (and thus at low temperature) to remove the ether-aldehyde overhead, the catalyst remaining as bottoms product. Further purification of the ether-aldehyde, if necessary, again can be effected by any known method, but preferably is effected by distillation.

The foregoing constitutes a general description of the process of this invention. The following examples are set out for the purpose of illustrating application of that process in particular cases. It is to be understood that these examples are included only for the purpose of illustrating the invention, and are not to be considered as limiting the invention in any way not recited in the claims.

The same equipment and experimental technique was used in all of these examples. In each case, there was used a reaction vessel equipped with means for introduction of the reactants and with means for heating or cooling the reaction mixture as necessary to maintain the desired reaction temperature. In each case, all of the alcohol reactant used was charged to the reactor, the catalyst was added and then the acrolein was slowly added to the alcohol-catalyst mixture. After addition of all of the acrolein, the reaction mixture was maintained at the reaction temperature until the reaction was deemed complete. The reaction mixture then was flash distilled to separate the beta-aliphaticoxy-propionaldehyde product from the catalyst and the separated aldehyde was distilled under vacuum to remove any impurities present therein.

Example I

In this experiment, ethyl alcohol was reacted with acrolein. The initial alcohol/acrolein mole ration was 3.2:1. The catalyst used was mono (triethylamine) phosphate. The catalyst concentration was 3.2% of the weight of the reaction mixture. The water content of the reaction mixture was 3.5% by weight. The reaction temperature was 40° C. Duration of the reaction was 130 hours. 92.3% of the acrolein was converted, the yield of beta-ethoxypropionaldehyde being 93%.

Example II

A larger scale experiment was performed, employing the conditions of the experiment reported in Example I—i.e., temperature, about 40° C., and about 3:1 ethanol to acrolein mole ratio and 3% monotriethylamine phosphate as catalyst. Reaction time, 106 hours. The product was distilled in continuous flow columns. About 11 gallons of beta-ethoxypropionaldehyde was recovered from about 30.5 gallons of reaction mixture, confirming the high acrolein conversion and beta-ethoxypropionaldehyde yield set out in Example I.

Example III

The experiment set out in Example I was again repeated, substituting monotriallylamine phosphate as catalyst, the amount of catalyst being 3% by weight of the reaction mixture. The water content was 4.7% w. At the end of 121 hours reaction time, 93% of the acrolein was converted, the yield of beta-ethoxypropionaldehyde being 98%.

Example IV 90 parts by weight of tri(amylamine)phosphate, 2200 parts by weight of allyl alcohol, and 710 parts by weight of acrolein were reacted at 40° C. for 141.5 hours. The acrolein conversion was 85%. The catalyst was removed by vacuum flashing. The distillate was distilled on a 20-plate column at 50 mm. to remove unreacted allyl alcohol. The bottoms were then distilled and 857 parts by weight of beta-allyloxypropionaldehyde boiling at 80° C. at 10 to 15 mm. was obtained. The yield of beta-allyloxypropionaldehyde was 94%.

Example V 203 parts by weight of absolute ethanol, 90.3 parts by weight of technical grade acrolein containing 97% w. acrolein, about 1% methanol, about 1% water, about 0.5% acetone and traces of other materials, and 16.9 parts by weight of tri(amylamine)phosphate catalyst were reacted at 40° C. for 91.5 hours. The water content was about 0.3% w. The reaction mixture was flash distilled to remove catalyst. The acrolein conversion was 96.3% and the yield of beta-ethoxypropionaldehyde on converted acrolein was 96%.

Suitably, pure acrolein may be used in the process of the invention. Equally suitably, commercially available acrolein may be used. Such acrolein usually contains small amounts of ketones (particularly acetone), aldehydes (particularly acetaldehyde and propionaldehyde), and water. In effecting addition of an alcohol to the acrolein, according to our invention, both the ketones and the aldehydes are substantially inert. The beta-ether substituted propionaldehyde product can be separated from the resulting mixture by suitable known methods. The effect of water on the reaction mixture has already been discussed.

We claim as our invention:

1. In a process for the preparation of a beta-aliphatic oxypropionaldehyde composed of carbon, hydrogen and oxygen wherein acrolein and an aliphatic alcohol of from 1 to 25 carbon atoms composed of carbon, hydrogen and oxygen and containing only reactive hydroxyl are caused to react in the liquid phase in the presence of a catalyst, the improvement which comprises employing as the catalyst a monoamine salt of an acid selected from the group consisting of phosphoric acid and sulfuric acid and a hydrocarbon amine wherein one hydrocarbon group of from 1 to 7 carbon atoms is bonded to the amino nitrogen atom and each of the remaining valences on amino nitrogen is satisfied by a member of the group consisting of hydrocarbon groups of from 1 to 7 carbon atoms and the hydrogen atom, and conducting the reaction under substantially anhydrous conditions.

2. The improvement set out in claim 1 wherein the acid is phosphoric acid and the amine is a trihydrocarbon amine.

3. The improvement set out in claim 2 wherein the acid is phosphoric acid and the amine is a trialkyl amine.

References Cited in the file of this patent

UNITED STATES PATENTS

| | | |
|---|---|---|
| 2,694,732 | McTeer et al. | Nov. 16, 1954 |
| 2,694,733 | McTeer et al. | Nov. 16, 1954 |
| 2,704,298 | Bellringer et al. | Mar. 15, 1955 |